United States Patent [19]
Catanzaro et al.

[11] Patent Number: 5,149,471
[45] Date of Patent: Sep. 22, 1992

[54] CLAMP FORCE CONTROL

[75] Inventors: John C. Catanzaro, Lebanon; Ronald M. Sparer, Cincinnati, both of Ohio

[73] Assignee: Cincinnati Milacron Inc., Cincinnati, Ohio

[21] Appl. No.: 716,423

[22] Filed: Jun. 17, 1991

[51] Int. Cl.⁵ ............................................. B29C 45/76
[52] U.S. Cl. .................... 264/40.5; 264/328.1; 425/149; 425/150; 425/593; 425/451.6
[58] Field of Search ............... 264/40.1, 40.5, 328.1, 264/328.11; 425/149, 150, 589, 592, 593, 450.1, 451.5, 451.6

[56] References Cited

U.S. PATENT DOCUMENTS 4,773,845  9/1988  Nagura et al. ............... 425/451.5
5,045,253  9/1991  Kamiguchi et al. ........... 425/593
5,059,365  10/1991 Hertzer et al. ............... 425/593

FOREIGN PATENT DOCUMENTS 277432  4/1990  German Democratic Rep. .................................. 425/593

Primary Examiner—Jill L. Heitbrink
Attorney, Agent, or Firm—Thompson, Hine and Flory

[57] ABSTRACT

A method for controlling clamping force on an injection molding machine by determining a toggle position at which the molds are in initial contact. That toggle position is determined as a function of a selected clamping force and a selected mold protect force and is effective to produce the desired clamping force when the toggle is fully extended.

14 Claims, 5 Drawing Sheets

CLAMP FORCE CONTROL

BACKGROUND OF THE INVENTION

I. Field of the Invention

The present invention relates to a clamp force control on an injection molding machine, and more particularly, the invention provides an automatic process for providing a more accurate clamp force control.

II. Description of the Related Art

Various types of mold clamping arrangements have been developed to hold a pair of mold members together while molten plastics material is injected into a mold cavity defined by the closed mold members. Mold clamping forces on injection molding machines range from tens of tons to thousands of tons. Such clamping forces are necessary to prevent the internal forces within the mold from forcing the mold members apart. Too small a clamping force can result in either a thin, external tab or protrusion of plastic material on the molded article, commonly referred to as "flash," or an incomplete filling of the mold cavity as a result of excessive separation of the mold members during injection. In either case, the resulting molded part is unacceptable.

Although it would be possible to avoid the mold separation problem by consistently imposing the maximum mold clamping force, repeated operation with unnecessarily high clamping loads can result in damage to the molds and is therefore undesirable. Accordingly, the externally applied mold clamping force should bear some close relationship with the actual internal mold separation force generated within the mold cavity, and therefore, control over the mold clamping force is highly desirable.

One system for providing an automatic clamp force control is disclosed in U.S. patent application Ser. No. 07/524,312 filed on May 17, 1990 and assigned to the same assignee as the present invention. The disclosed force control provides an automatic adjustment of the die height platen and toggle mechanism in response to a desired clamping force. Clamp force control is accomplished by controlling the toggle position at which the molds come into initial contact so that the desired clamp force is attained upon the toggle reaching its fully extended position.

As part of a normal clamp closing cycle, not only is a desired final clamping force defined, but an initial clamping force or mold protect force is also defined by the machine user. The mold protect force is set to be a relatively small value such that if there is any unanticipated contact between the molds, and the clamping forces build up to the mold protect force, that force may be detected, and the clamp closing cycle terminated prior to any mold damage.

The mold protect force is typically a function of the toggle mechanism design, mold weight, tooling weight, lubrication and frictional forces within the clamp and other variables that exist from one mold and machine to the other. An ideal mold protect force is represented by the threshold forces required to overcome the gravitational and frictional forces opposing motion of the mold. Therefore, such ideal force is just large enough to permit the toggle mechanism to move the mold but small enough to cause the toggle mechanism to stall out in the event of any undesirable interference, e.g., from a molded part, an unretracted ejector, etc.. Mold protect force is typically set to a value slightly greater than the ideal value by a machine operator. To set mold protect, starting with the clamp open, the operator will typically establish successively greater mold protect values until motion of the clamp is detected. That value or a slightly greater value is then selected as the mold protect force.

Any force exerted by the clamping mechanism when the molds are in contact including the mold protect force will result in a tensional force on the tie bars connecting the stationary platen and die height platen which causes the tie bars to stretch. Therefore, if the final clamping force is to be controlled by regulating toggle position upon mold touch, and further, if different mold protect forces result in additional magnitudes of tie bar stretch, then a failure to modify toggle position as a function of those magnitudes of tie bar stretch will create a less accurate control of clamping force.

SUMMARY OF THE INVENTION

The present invention is an improved clamp force control for a toggle type injection molding machine having a toggle mechanism providing relative motion between a first mold element affixed to a movable platen and a mating mold element affixed to a stationary platen. A die height adjustment mechanism effects motion between the stationary platen and a die height platen providing a support for the toggle mechanism. In order to establish a desired mold clamping force, the present invention establishes a toggle position, i.e. toggle configuration, relative to the point of initial contact between the mold elements, such that when the toggle is fully extended the desired clamping force is achieved. For purposes of this disclosure, mold touch position ("MTP") is defined as the toggle position at which the molds come into initial contact with a clamping force equal to a selected mold protect force, and the desired mold touch position ("DMTP") is that toggle position at mold touch which will produce the desired clamping force upon the toggle mechanism being operated to its fully extended position.

The desired mold touch position associated with the desired clamping force is determined by taking into consideration whatever mold protect force is set by the machine user. As part of an initial calibration of the machine, first data relating clamping force to toggle position at mold touch for a given mold protect force and second data relating mold protect force to toggle position at mold touch for a given clamping force are determined and stored. Thereafter, during machine operation, an automatic clamping force adjustment cycle may be initiated which recalibrates the toggle position at mold touch necessary to produce the desired clamping force.

An advantage of the design is that the clamp is adjusted to provide a desired clamping force by a non-manual, automatic cycle of operation. A further advantage is that the clamp adjustment includes compensation for variations in mold protect force. Accordingly, it is an object of the present invention to provide an automatic cycle for an injection molding machine which quickly and accurately adjusts the position of the toggle mechanism so that the clamp operates to produce the desired clamping force independent of mold protect forces selected by the machine user.

Further advantages and objects of the present invention shall become apparent from the accompanying drawings, the following description and the appended claims.

DETAILED DESCRIPTION

Figure 1:
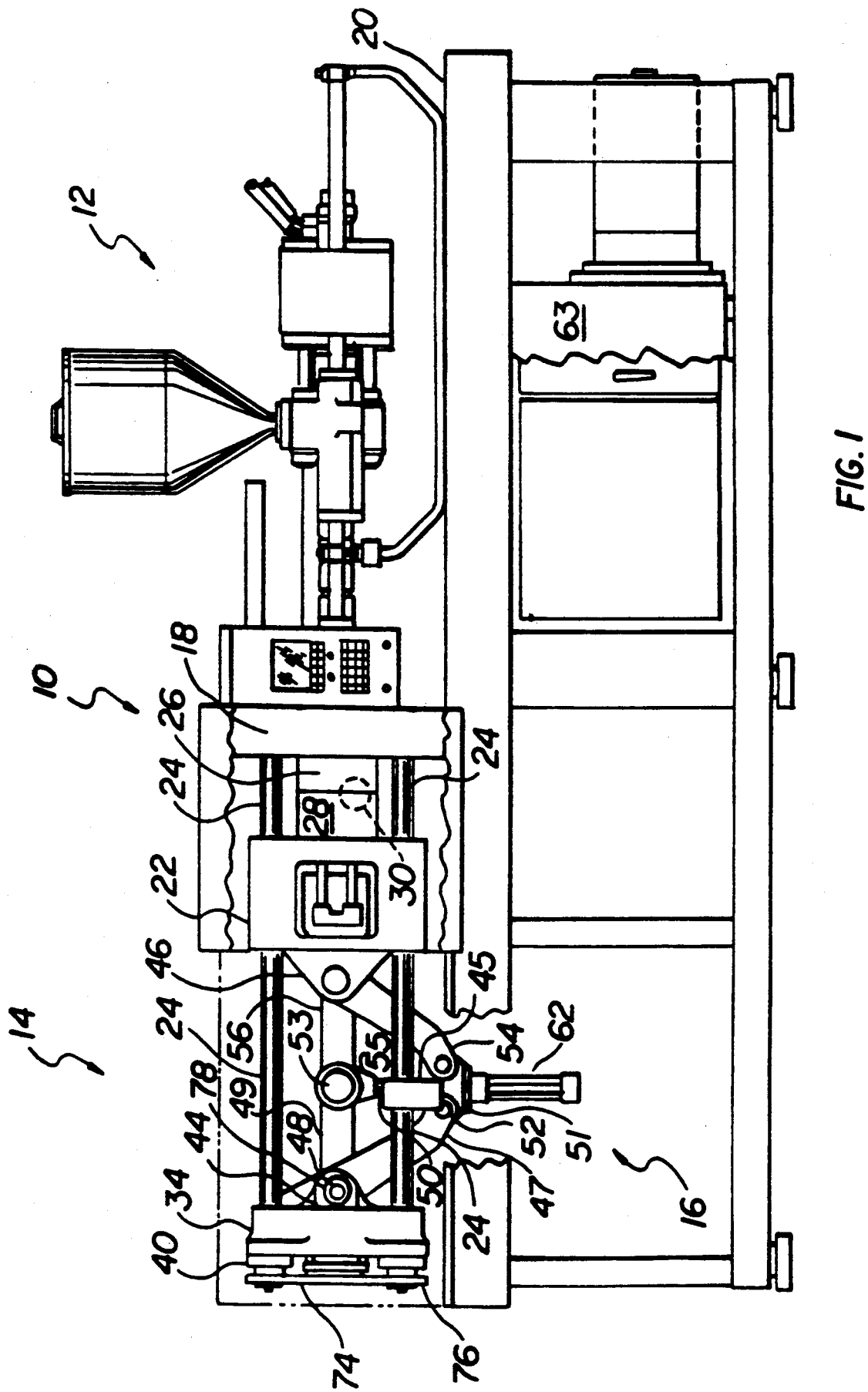
FIG. 1 is a side view of an injection molding machine.

Referring to FIG. 1, an injection molding machine 10 is shown that includes an injection system 12 and a clamp 14 which includes a toggle mechanism 16. The injection system is not illustrated in detail, and the structure and operation of the injection system may be one of any number of types that are well known to those who are skilled in the art.

Clamp 14 includes a stationary platen 18 that is secured to a suitable machine base 20, and it also includes a movable platen 22 that is slidably supported for movement along four parallel guide rods or tie bars 24 that extend outwardly from stationary platen 18 toward toggle mechanism 16. Stationary platen 18 carries a stationary mold element 26, and movable platen 22 carries a movable mold element 28. Movable mold element 28 is cooperable with stationary mold element 26 to define one or more mold cavities 30 that receive molten plastic material. Plastic is heated and softened by an injection system 12 and is then injected into mold cavity 30 to form a molded part. In FIG. 1, the clamp 14 is shown in a closed position in which the toggle mechanism 16 is fully extended to its locked position, and the mold elements 26 and 28 are closed under a predetermined clamping force. Clamp 14 is adapted to move movable platen 22 toward and away from stationary platen 18 and to apply a clamping force to mold elements 26 and 28 during the time molten plastic material is injected into the mold cavity. As shown, clamp 14 includes a clamp support, i.e. die height platen, 34 that is spaced from movable platen 22 along the longitudinal axis of the machine. Tie bars 24 which extend from four corners of the stationary platen 18 pass through suitable openings formed at four corners in the die height platen 34 so that threaded ends of the tie bars 24 can be threadedly connected with respective nuts 40 that are rotatably carried on the rear face of die height platen 34. The toggle mechanism is supported by front and rear support blocks 45 which are secured to the base 20 and have bores for slidably receiving the lower pair of tie bars.

Extending between die height platen 34 and movable platen 22 is a toggle mechanism 16 that extends between die height platen yoke 44 and movable platen yoke 46. The toggle mechanism 16 is comprised of several pivotally connected toggle elements including a first link 47 having one end pivotally connected to yoke 44 by pivot pin 48. The other end of link 47 is pivotally connected by pin 52 to support block 51 which supports the hydraulic cylinder 62. One end of another link 49 is also pivotally connected to yoke 44 by pivot pin 48, and the other end of link 49 is connected to crosshead 55 and one end of link 56 by pivot pin 53. Crosshead 55 is connected to one end of the piston 50 of actuator 62.

In a similar manner, links 54 and 56 are connected between support block 51, crosshead 55 and yoke 46 on the movable platen 22. Hydraulic cylinder 62 functions as a clamp actuator and is connected to and actuates the toggle mechanism 16 to cause the first mold element 28 mounted on movable platen 22 to be moved toward and away from the second mold element 26 mounted on the stationary platen 18.

In FIG. 1, actuator 62 is shown as a hydraulic actuator which is supplied hydraulic fluid by a hydraulic pump and tank unit 63. The application of hydraulic actuators on an injection molding machine and the supply of hydraulic fluid to those actuators at predetermined pressures is well known to those who are skilled in the art. For example on hydraulic machines, the mold protect force may be defined in terms of a mold protect pressure. Therefore, in response to the mold protect pressure, the hydraulic system is effective to control the pressure of the fluid supplied to the actuator 62 so that when the forces resisting motion of the movable platen exceed the mold protect pressure, the actuator stalls and motion of the movable platen stops.

The die height platen 34 can be positioned so as to accommodate molds having different dimensions in the machine longitudinal direction, and thus is used to adjust the "die height," which is the spacing between the stationary and movable platens when the mold elements are in contact. Such adjustment of die height platen 34 is effected by turning the respective adjusting nuts 40 in the proper direction to provide the necessary shift in position of die height platen 34.

The structure for effecting movement of die height platen 34 in a direction along the longitudinal axis of the machine is typical of such structures which are well known in the art. The structure includes a die height motor (not shown) that is secured to the rear face of die height platen 34. Die height motor carries and drives a driving sprocket (not shown) which, in turn, drives a chain 74 that passes around the driving sprocket and also around respective driven sprockets 76, each of which is carried by one of adjusting nuts 40.

Also attached to die height platen 34 is a displacement sensor 78, which can be in the form of a rotary potentiometer connected to the yoke 44. Displacement sensor 78 is provided to monitor the position of the links or toggle elements of the toggle mechanism. For example, the sensor may be calibrated to measure the position of the toggle element 47 with respect to a reference on the clamp 14 such as the yoke 44. Each different position of the toggle element 47 corresponds to a unique and different configuration of the toggle elements of the toggle mechanism 14. Alternatively, position sensors may be used to measure the linear displacement of the crosshead 55 or the displacement of the movable platen 22.

The present invention controls the toggle position or configuration at the mold touch position prior to the toggle achieving its locked position. When the clamp is open, crosshead 55 is pulled toward actuator 62. When the clamp is closed but not locked such as at the mold touch position, crosshead 55 is located at an intermediate position just below the illustrated locked position. As the toggle is operated from the mold touch position to its fully extended locked position, a clamp force is produced to hold the mold elements together The clamp force causes the tie bars to stretch by a total distance that is a function of the forces exerted by the toggle mechanism including the mold protect force and the effective length of the tie bars. The effective length of the tie bars changes each time the position of the die height platen is adjusted to accommodate different molds, to provide a new mold touch position, etc.

Therefore, to achieve a desired clamping force, a mold touch position must be established as a function of the selected clamping force and mold protect force as well as the tie bar stretch resulting from a selected clamping force and the selected mold protect force. The present invention provides a modification of the mold touch position to adjust the mold touch position by a magnitude that is a function of, e.g. equal and opposite, the total magnitude of tie bar stretch that is caused by desired clamping force and the mold protect force.

Figure 2:
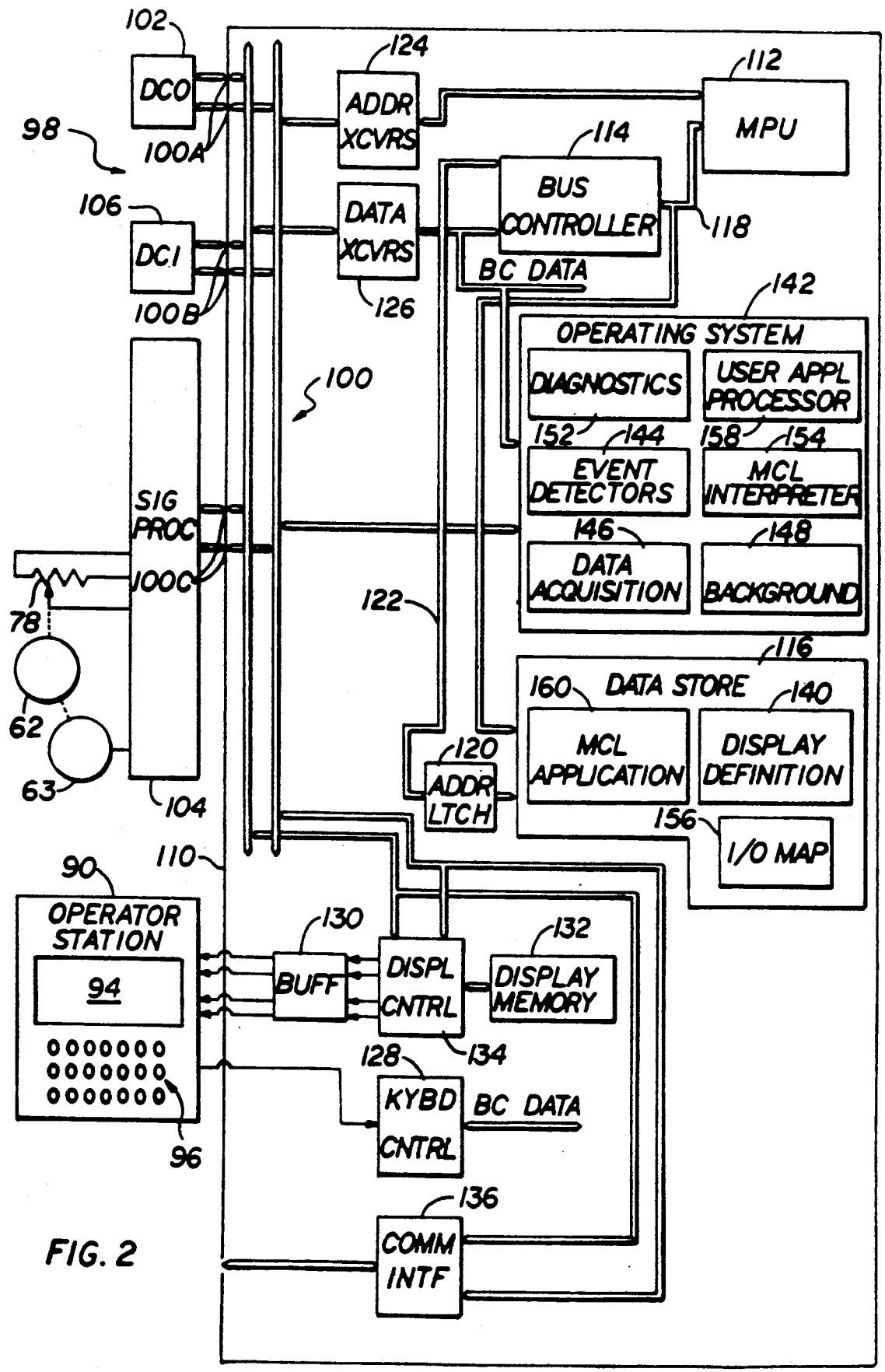
FIG. 2 is a block diagram of the machine control applied to the machine of FIG. 1.

FIG. 2 is a block diagram of an injection molding machine control that may be applied to the injection molding machine of FIG. 1 and in which the invention may be implemented. The machine of FIG. 1 and control of FIG. 2 are commercially available from Cincinnati Milacron Inc. as the VISTA SENTRY line of injection molding machines with a CAMAC VSx control. The operation of the control 98 is described in greater detail in U.S. patent application Ser. No. 643,977 filed on Jan. 18, 1991 and U.S. patent application Ser. No. 644,064 filed on Jan. 18, 1991. Both of said applications being assigned to the assignee of the present application and both of said applications being incorporated herein by reference. Control 98 includes a processor module 110 to which are connected interface modules such as, for example, output interface module 102, input interface module 106, and analog I/O interface 104. Processor module 110 executes machine control application programs 160 which define a machine cycle of operation for the production of molded articles. In addition, processor module 110 executes user application programs 140 to perform functions associated with peripheral devices such as the creation of display functions associated with display 94.

Control of the operation of machine actuators, e.g. clamp actuator 62, is performed by analog I/O interface 104 in response to set point signals produced by processor module 110 by execution of application programs 160. The position of mechanisms connected to machine actuators may be measured by, for example, potentiometers and the like, such as position sensing potentiometer 78 shown in FIG. 2 which produces a feedback signal representing toggle position. Velocity of the toggle mechanism 16 may be derived from the toggle position feedback signal.

Operation of devices associated with machine 10 which are controlled by binary control signals, i.e., ON/OFF control signals, is effected through output interface modules such as, for example, DC output interface module 102. Binary status signals may be produced in response to the binary control signals applied to output interface modules as well binary input signals produced by devices connected to binary input interfaces such as, for example, DC input interface module 106. Each of the modules 102, 104, and 106 are electrically connected to processor module 110 via a bus 100 over which are conducted data, address and bus control signals.

User application programs 140 and machine control application programs 160 are stored in memory 116. User application programs include the programs required by the present invention and include data tables and other stored data values that may be required These programs are executed by microprocessor 112 under control of operating system programs recorded in read-only-memory (ROM) 142. Data is transferred between the internal data bus of microprocessor 112 and memory 116 directly over local data bus 118. Memory data addresses are transferred over memory address bus 122 and latched at address latch 120. Memory address bus 122 and data lines of the bus 100 are controlled by bus controller 114 and data transceiver 126. All data exchanges between microprocessor 112 and bus 100 are performed through bus controller 114. Bus controller 114 produces control signals for controlling the transfer of data over bus 100, provides buffering of a data bus signals produced by microprocessor 112, and incorporates: an interrupt controller; a real time clock generator; a direct memory access controller; a programmable interval timer; interface logic for a numeric coprocessor; and, interface logic for a keyboard controller.

Keyswitch signals produced by keyboard 96 of operator station 90 are interfaced to processor module 110 by a serial link connected to keyboard controller 128. Keyboard data is received in serial form and is made available at an eight bit data bus tied to the bus controller.

Operating system programs executed by microprocessor 112 include event detector programs 144, data acquisition programs 146, background programs 148, diagnostic programs 152, machine control interpreter programs 154 and user processor programs 158. Event detector programs 144 control continuous monitoring of selected signals, e.g. position, velocity and pressure signals; and event detector programs further control programmed responses to the detection of predetermined (trigger) conditions of those signals. Data acquisition programs 146 control periodic sampling of selected input signals for use in performing process monitoring under control of the machine control application programs. Diagnostic programs provide power on diagnostics of control system components, initialization of selected data values and initiation of system program execution. Background programs 148 provide data interfaces for user application programs as well as management of real time clock data produced by bus controller 114.

Figure 4:
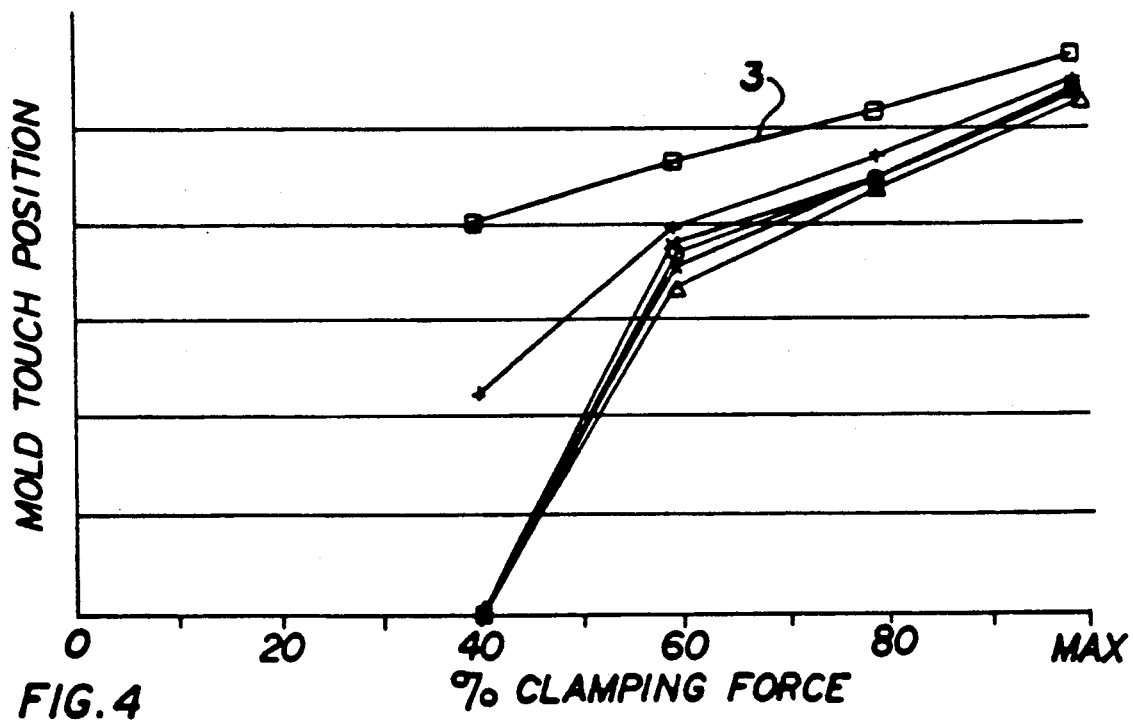
FIG. 4 is a family of curves illustrating variations in mold touch position as a function of variations in clamping force.

Applicants investigated the relationship between toggle position and force on a toggle type injection molding machine. FIG. 4 illustrates a family of curves defining toggle position at initial mold touch necessary to produce a corresponding clamping force Each curve is plotted for a different mold protect force. The uppermost curve 3 represents the least mold protect force, and each successively lower curve represents a successively greater value of mold protect force. Applicants observed that each curve is generally shifted or offset as the desired mold protect force changes. It may be further observed that for a given mold protect force, the relationship between mold touch position and force is approximately linear between maximum clamping force and approximately 60% of the maximum clamping force. Therefore, applicants have assumed that the relationship between mold touch position and force for different mold protect forces is a series of parallel straight lines which are offset from each other as a function of the magnitude of the mold protect force. The slope of the curve defines different mold touch positions for different clamp forces and is a function of the tie bar stretch resulting from different clamping forces. The shift or offset between the curves is a function of the different mold protect forces and the resulting tie bar stretch.

Figure 5:
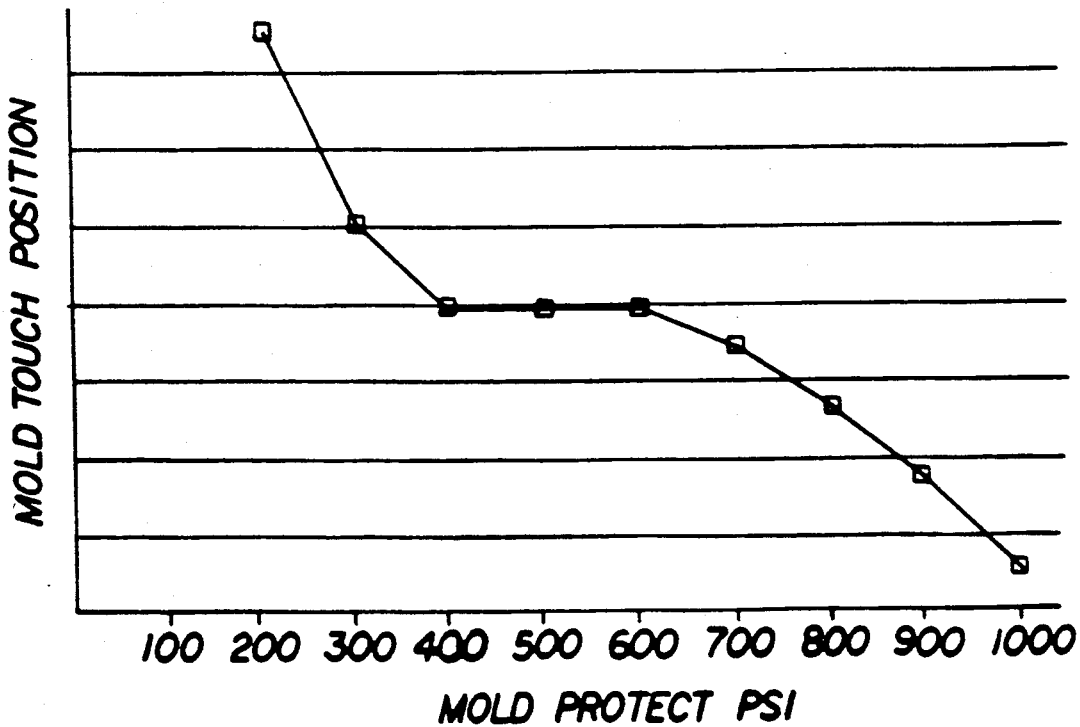
FIG. 5 is a curve illustrating variations in mold touch position as a function of different mold protect forces.

FIG. 5 is a curve illustrating toggle position at initial mold touch as a function of mold protect force for a given clamping force. That curve more clearly illustrates the offset or bias of mold touch position caused by differences in mold protect force. If different clamping forces are chosen, the curve in FIG. 5 will change. However, preferably, the curve of FIG. 5 represents a clamping force that is in the middle of the range of the applicable clamping forces. For example, the curve in FIG. 5 is plotted at 80% of the maximum clamping force which is half way between maximum clamping force and 60% of maximum clamping force.

In order to control clamping force, the present invention not only takes into consideration the desired clamping force but also the desired mold protect force. Applicants have resolved the relationship between a desired mold touch position and a desired clamping force into the following mathematical equation for a straight line:

$$DMTP = K_1(DCF) + K_2 + {}^\wedge MTP, \tag{1}$$

where
DMTP = Desired Mold Touch Position
DCF = Desired Clamping Force
$K_1$ = Slope of the straight line
$K_2$ = Mold Touch Position Axis Intercept
$^\wedge MTP$ = Change in Mold Touch Position The constants $K_1$ and $K_2$ may be solved for one of the curves in FIG. 4, for example, the curve 3 which was plotted at a reference mold protect force of 200 psi. The value for $^\wedge MTP$ may be determined from the curve of FIG. 5 which is a plot of mold touch position as a function of mold protect force for a given clamping force.

If the constants $K_1$ and $K_2$ for the equation are calculated for the curve 3 which may be associated with the reference mold protect force of 200 psi, but a mold protect force of 300 psi is selected by the operator, the control will define $^\wedge MTP$ as the difference in mold touch position between 300 psi and 200 psi as read from FIG. 5. For that example, the difference is a negative number which will be subtracted from $K_2$. The resulting relationship of $^\wedge MTP$ to clamp force for a mold protect force of 300 psi will be a straight line parallel to curve 3 in FIG. 4 but offset below curve 3 by $^\wedge MTP$. Therefore, equation (1) may be used to determine a mold touch position for a selected mold protect force and a selected clamping force which is 60% or more of the maximum clamping force. As will be appreciated, whether $^\wedge MTP$ is added or subtracted will depend on the magnitude of the desired mold protect force relative to the magnitude of the reference mold protect force associated with the curve in FIG. 4 used to create the constants in Equation (1). If $^\wedge MTP$ is zero, equation (1) will define a desired mold touch position required for the desired clamping force. $^\wedge MTP$ provides a mold touch position modification based on the selected mold protect force.

In order to establish the control parameters necessary to practice the present invention, several set up procedures may be used. For example, during runoff of a machine, a load cell may be installed on the clamp to measure clamping force. A machine operator executes a calibration procedure to establish values which are stored in the application store 160 of the data store 116 shown in FIG. 2. At a given mold protect force, e.g. 100 psi, the clamp is cycled and the die height adjusted until maximum clamp force is measured, and the mold touch position which provides the maximum force is measured and stored. In a similar fashion, for the same mold protect force, a mold touch position which provides sixty percent of maximum force is determined and stored. Those two stored positions may be used to define the constants in equation (1) thereby defining a linear relationship similar to the curve 3 in FIG. 4. It should be noted that other procedures may be used for determining the relationship illustrated in FIG. 4. For example, a series of mold touch positions may a stored which correspond to a series of desired clamping forces. With such a technique, the linear relationship assumption made by applicants is not necessary. For any given clamping force, a corresponding toggle position may be interpolated between the stored positions; and that position modified by the change in the mold touch position derived from FIG. 5, thereby producing the desired mold touch position.

Similarly, with regard to FIG. 5, at the midpoint of the a range of clamping forces defined above, e.g. 80% of the maximum clamping force, operative mold protect forces may be chosen, for example, 100 psi to 500 psi. That range may be divided into an arbitrary number of increments, for example, ten; and for each of the resulting mold protect forces, a corresponding mold touch position may be identified and stored Thereafter, for any selected mold protect force, an associated mold touch position may be defined by interpolating between the closest two stored toggle positions corresponding to the closest stored mold protect forces. Alternatively, over a given range of mold protect forces, the relationship to mold touch position may be assumed to be linear, and two points stored from which the linear relationship may be determined. Thereafter, other toggle positions may be determined utilizing the linear relationship.

As part of the normal operation of an injection molding machine, certain procedures are generally followed prior to the start of a normal cycle of operation. For example, in the usual operation of such a machine, it is necessary either to initially install a set of molds or to replace one set of molds with another set. The mold installation process is relatively standard; and after the molds are installed, the operator will manually move the machine to various positions in a cycle of operation and store in data store 116 of FIG. 2 position signals represented by position and velocity set point values. The control 98 includes an event detector program that defines a sequence of events which are triggered in response to the process achieving stored set point values for process variables, e.g. position, pressure, velocity, etc. After the cycle set points are set, the clamp may be operated to its open position. Utilizing the operator station of FIG. 2, the operator selects values for the desired clamp force and the mold protect force which are stored as signals in the data store 116 At that point, the operator may initiate the automatic die height adjust cycle. The automatic die height adjust cycle will establish the desired mold touch point that will result in a desired clamping force upon the toggle mechanism being operated to its fully extended position.

Figure 3A:
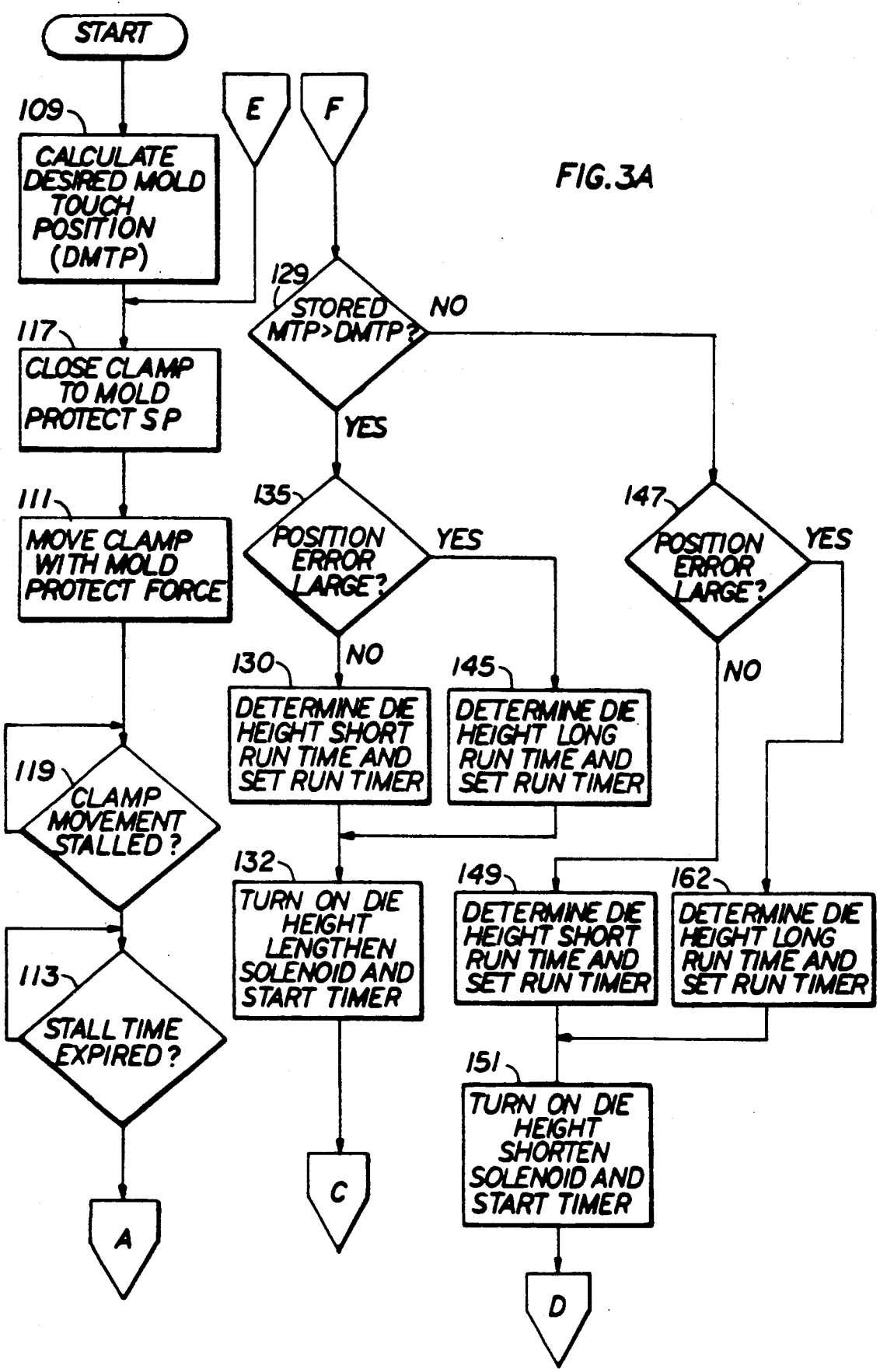
FIGS. 3a and 3b are a flow chart illustrating the steps that are followed in carrying out clamp force control process of the present invention.
Figure 3B:
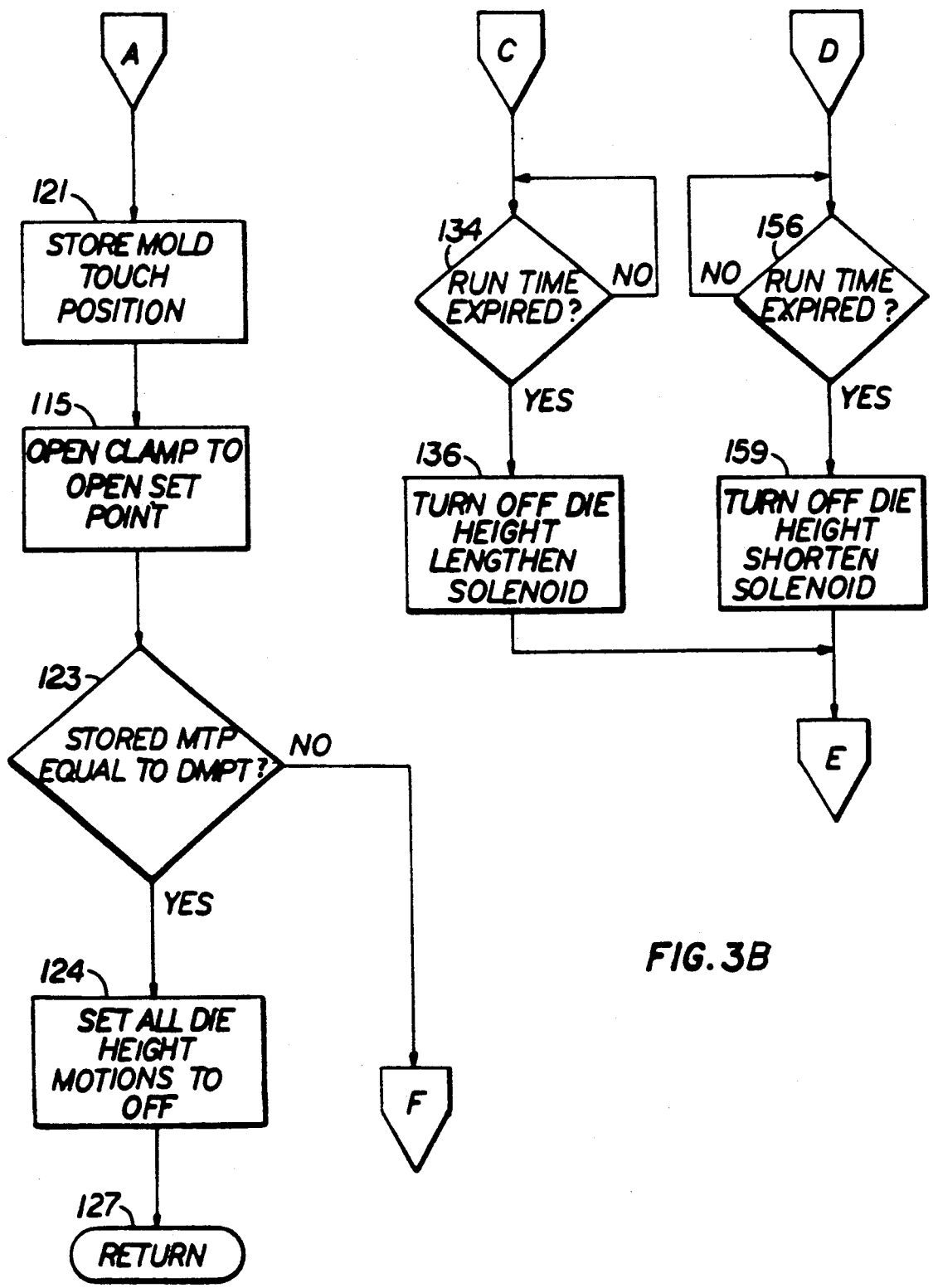

FIGS. 3a and 3b are a flow chart illustrating a process that may be executed by the machine and control illustrated in FIGS. 1 and 2 to establish the desired mold touch position in accordance with the present invention. In step 109, a value for the desired mold touch position is calculated using equation (1) and the values for the desired clamping force and the mold protect force selected by the operator. To determine a value for the constants in equation (1), the control utilizes the data relating clamping force to toggle position at mold touch and mold protect force to toggle position at mold touch which was stored during the machine run-off as previously described.

Per step 110, the clamp is then closed at a low velocity to a first position which is a standard part of a clamp close cycle and at which the selected mold protect force or pressure is to enabled as a set point. Operation of the toggle mechanism is produced by the control 110 producing a control signal to signal processor 104 which in turn provides a signal effective to operate actuator 62. In the case of a hydraulic system, signal processor provides a signals to valves in the hydraulic circuit 63 which provides hydraulic fluid to actuator 62 resulting in motion of the clamp. As shown in step 111, the clamp closure continues by moving the clamp at a slow mold protect velocity. Hydraulic fluid is supplied to actuator 62 at a pressure such that if the movable mold element encounters a force exceeding the mold protect force, the actuator will stall; and motion of the movable mold element will stop. The velocity of the clamp closure is monitored using the position transducer 78 of FIG. 1 to determine when the operation of the toggle mechanism stops, i.e. stalls, as shown in step 112. Per step 113, using programmable time delays in the application program 160 of FIG. 2, the absence of motion is detected for a predetermined period of time, e.g. two seconds, afterwhich the current toggle position which is the mold touch position is stored as required in step 114. Thereafter, the clamp is opened to a position defined by an open set point per step 115.

If the stored toggle position is determined in step 116 to be approximately equal to the desired mold touch position, i.e. the required toggle position, the adjustment elements of the machine are turned off in step 118; and the adjustment sequence is ended in step 120. Thereafter, given the operator defined desired clamping force value and the desired mold protect force value, in a subsequent automatic cycle of machine operation, the control will produce a first control signal as a function of those two values which will be effective to move the toggle mechanism to a desired mold touch position. Thereafter, a second control signal will be produced to move the clamp to its fully extended position thereby producing the desired clamping force.

However, if the stored toggle position is not equal to the desired mold touch position as shown in step 122, the stored toggle position is checked to determine whether it is greater than the desired mold touch position which indicates a condition under which the die height platen is too close to the stationary platen and would result in too high a clamping force If so, a determination is made in step 126 as to whether the difference between the stored mold touch position and the desired mold touch position is large, i.e., greater than a particular value. If it is not, then steps 130 through 134 are executed, and the die height motor is activated to move the die height platen away from the movable platen. If the speed of the die height platen motor is adjustable, a slower speed would be used. If the die height motor speed is fixed, the time the motor runs is determined per step 130. The run time may be a function of the difference between the stored toggle position and the desired mold touch position. Alternatively, the run time may be for a fixed period of time. Once the die height platen has been shifted, step 136 is executed, the die height motor is stopped, and pursuant to steps 110 through 115, the clamp is closed as previously described until it stalls, and a new toggle position defining a new mold touch position is stored. If the new stored toggle position is then within a approximately equal to the desired mold touch position, as determined in step 116, the adjustment sequence is terminated. If it is not, then the adjustment sequence is repeated until the required toggle position is achieved.

Returning to step 126, if the toggle position is incorrect by greater than a predetermined amount, the die height platen is adjusted using either a faster velocity, or pursuant to step 145, a longer time period than determined in step 130. In this situation, the die height will be moved adjusted to the required position more quickly If the comparison made pursuant to step 122 determines that the stored toggle position is less than the required toggle position, which would occur when the die height platen is too far away from the stationary mold platen, resulting in too low a clamping force, an adjustment sequence is followed, as shown in steps 148 through 158. Again, depending on the magnitude of the difference between the stored toggle position and the desired mold touch position, the die height motor may be run for a shorter or a longer period of time.

It is well within the skill of those in the art to create an application program following the steps of the flow chart illustrated in FIGS. 3a and 3b using a machine control such as shown in FIG. 2 or similar control. Further, it may be desirable that after a predetermined number of operating cycles, the process of FIGS. 3a and 3b be executed to provide a check of toggle position so that the desired clamping force is maintained. The invention is described with reference to a single toggle injection molding machine as shown in FIG. 1, as will be apparent to those who are skilled in the art, the invention may also be applied to machines having a double toggle design. Further, the invention is described with reference to a hydraulic injection molding machine Again it is clear that the invention may be applied to a toggle-type injection molding machine having an electric clamp drive.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A method for providing a desired clamping force to hold first and second mold elements on a molding machine in contact, said molding machine having a clamp for generating a clamping force by operating a toggle mechanism to a fully extended configuration in response to control signals generated by a machine control, the method comprising the steps of:
   a. producing a first value representing the desired clamping force;
   b. producing a second value representing a desired initial clamping force;
   c. determining in response to the first and second values a desired mold touch position representing a first configuration of the toggle mechanism upon the mold elements achieving initial contact, said configuration being effective to produce the desired clamping force upon the toggle mechanism being operated to the fully extended configuration;

d. producing a first control signal representing the desired mold touch position;

e. operating the clamp in response to the first control signal to move the toggle mechanism to the first configuration simultaneously with mold elements achieving initial contact;

f. producing a second control signal representing the fully extended configuration of the toggle mechanism; and g. operating the toggle mechanism to the fully extended configuration in response to the second control signal thereby applying the desired clamping force to the mold elements.

2. The method of claim 1 wherein the toggle mechanism includes toggle elements movable with respect to a reference on the clamp and a configuration of the toggle mechanism is defined by a position of a first toggle element with respect to the reference, and wherein the step of determining a desired mold touch position further comprises the steps of:

a. determining a first position of the first toggle element as a function of the first value representing the desired clamping force;

b. determining a second position of the first toggle element as a function of the second value representing the desired initial clamping force; and c. modifying the first position as a function of the second position to produce the desired mold touch position.

3. The method of claim 2 wherein the steps of determining the first and second positions further comprise the steps of:

a. determining a first relationship between desired clamping forces and mold touch positions of the first toggle element;

b. determining the first position of the first toggle element utilizing the predetermined clamping force and the first relationship;

c. determining a second relationship between desired initial clamping forces and mold touch positions of the first toggle element; and d. determining the second position of the first toggle element utilizing the desired initial clamping force and the second relationship.

4. The method of claim 3 wherein the desired clamping force is within a range of predetermined clamping forces and the step of determining the first relationship further includes the steps of:

a. operating the toggle mechanism to the fully extended configuration;

b. measuring a first clamping force;

c. comparing the first clamping force to a predetermined clamping force to detect equality therebetween;

d. moving the toggle mechanism and the reference on the clamp with respect to the molding machine in response to the predetermined clamping force and the first clamping force not being equal;

e. iterating steps a. through d. until the measured first clamping force equals the predetermined clamping force;

f. storing a first mold touch position representing a position of the first toggle element upon the molds achieving initial contact when the first clamping force equals the predetermined clamping force; and g. iterating steps a. through f. to store a number of first mold touch positions equal to a predetermined number of predetermined clamping forces.

5. The method of claim 4 wherein the method further comprises the step of selecting a predetermined clamping force.

6. The method of claim 4 wherein one of the predetermined clamping forces equals a maximum clamping force and one of the first mold touch positions represents a position of the first toggle element upon the molds achieving initial contact when the first clamping force equals the maximum clamping force.

7. The method of claim 4 wherein one of the predetermined clamping forces equals sixty percent of a maximum clamping force and another of the first mold touch positions represents a position of the first toggle element upon the molds achieving initial contact when the first clamping force equals sixty percent of the maximum clamping force.

8. The method of claim 3 wherein the desired initial clamping force is within a range of mold protect forces and the step of determining the second relationship further includes the steps of:

a. operating the toggle mechanism to bring the mold elements into initial contact without operating the toggle mechanism to the fully extended configuration;

b. measuring an initial clamping force;

c. comparing the measured initial clamping force to the desired initial clamping force to detect equality therebetween;

d. storing a second mold touch position representing a position of the first toggle element upon the molds achieving initial contact when the measured initial clamping force equals the desired initial clamping force; and e. iterating steps a. through e. to store a number of second mold touch positions equal to a predetermined number of desired initial clamping forces.

9. The method of claim 8 wherein the clamp has a maximum clamping force and the method further comprises a first step of selecting a desired clamping force approximately equal to eighty percent of the maximum clamping force.

10. The method of claim 8 wherein the range of mold protect forces is in a range of from 100 to 500 pounds per square inch.

11. A method for establishing a desired clamping force exerted by a movable mold element against a stationary mold element, said movable mold element being connected to a toggle mechanism operable to move the movable mold element from a first position of no contact with the stationary mold element to a second position of contact with the stationary mold element at which second position a clamping force is applied to said mold elements upon the toggle mechanism being in a fully extended position, the position of the toggle mechanism and the movable mold element being adjustable relative to the stationary mold element, the method comprising the steps of:

a. determining a desired mold touch position required to provide the desired clamping force independent of a mold protect force;

b. producing a control signal in response to the desired mold touch position;

c. operating the toggle mechanism in response to the control signal to move the movable mold element into contact with the stationary mold element;

d. terminating operation of the toggle mechanism in response to a clamping force between the mold elements exceeding the mold protect force;

e. producing a feedback signal representing an actual mold touch position of the toggle mechanism upon motion of the movable element being terminated;

f. testing for equality between the desired mold touch position and the actual mold touch position;

g. adjusting the position of the toggle mechanism and the movable platen relative to the stationary platen in response to an absence of equality between the desired mold touch position and the actual mold touch position;

h. iterating steps b. through g. until there is equality between the desired mold touch position and the actual mold touch position;

i. producing a second control signal representing the fully extended position of the toggle mechanism; and j. operating the toggle mechanism to the fully extended position in response to the second control signal thereby applying the desired clamping force to the mold elements.

12. The method of claim 11 wherein the step of determining the desired mold touch position further comprises the steps of:

a. selecting the desired clamping force;

b. selecting a mold protect force upon the molds achieving an initial contacting relationship; and c. calculating the desired mold touch position in response to the desired clamping force and the desired mold touch position.

13. The method of claim 11 wherein the step of adjusting the position of the toggle mechanism further comprises the steps of:

a. testing for the inequality between the desired mold touch position and the actual mold touch position being greater than a predetermined magnitude;

b. moving the toggle mechanism and the movable platen relative to the stationary platen through a first displacement in response to the inequality between the desired mold touch position and the actual mold touch position being greater than a predetermined magnitude; and c. moving the toggle mechanism and the movable platen relative to the stationary platen through a second displacement in response to the inequality between the desired mold touch position and the actual mold touch position being less than a predetermined magnitude, said second displacement being less than said first displacement.

14. A method for establishing a desired clamping force exerted by a movable platen against a stationary platen on an injection molding machine, said movable platen being connected to a toggle mechanism operable to move the movable platen from a first position of initial contact with the stationary platen through a lock over displacement to a second position of contact with the stationary platen at which second position a clamping force is applied to said platens upon the toggle mechanism being in a fully extended position, said movable platen and toggle mechanism being slidably supported on bars having ends connected between the stationary platen and a support platen movable with respect to the machine, said bars being stretched in response to the toggle mechanism applying a clamping force between the movable and stationary platens, the method comprising the steps of:

a. selecting a desired clamping force being effective to stretch the bars by a first magnitude;

b. selecting a mold protect force being effective to stretch the bars by a second magnitude;

c. determining in response to the desired clamping force and the mold protect force a desired mold touch position representing a position of the movable platen relative to the stationary platen upon the mold elements achieving initial contact;

d. producing a first control signal representing the desired mold touch position;

e. operating the toggle mechanism in response to the first control signal to move the toggle mechanism to the desired mold touch position thereby applying a clamping force equal to the mold protect force and stretching the bars a total amount equal to the second magnitude;

f. producing a second control signal representing the fully extended configuration of the toggle mechanism; and g. operating the toggle mechanism to the fully extended configuration in response to the second control signal thereby applying the desired clamping force and stretching the bars a total amount equal to the first magnitude.

* * * * *